March 18, 1958    J. W. UNDERWOOD    2,827,540
AUXILIARY ELECTRICAL HEATING SYSTEM FOR MOTOR VEHICLES
Filed May 9, 1956
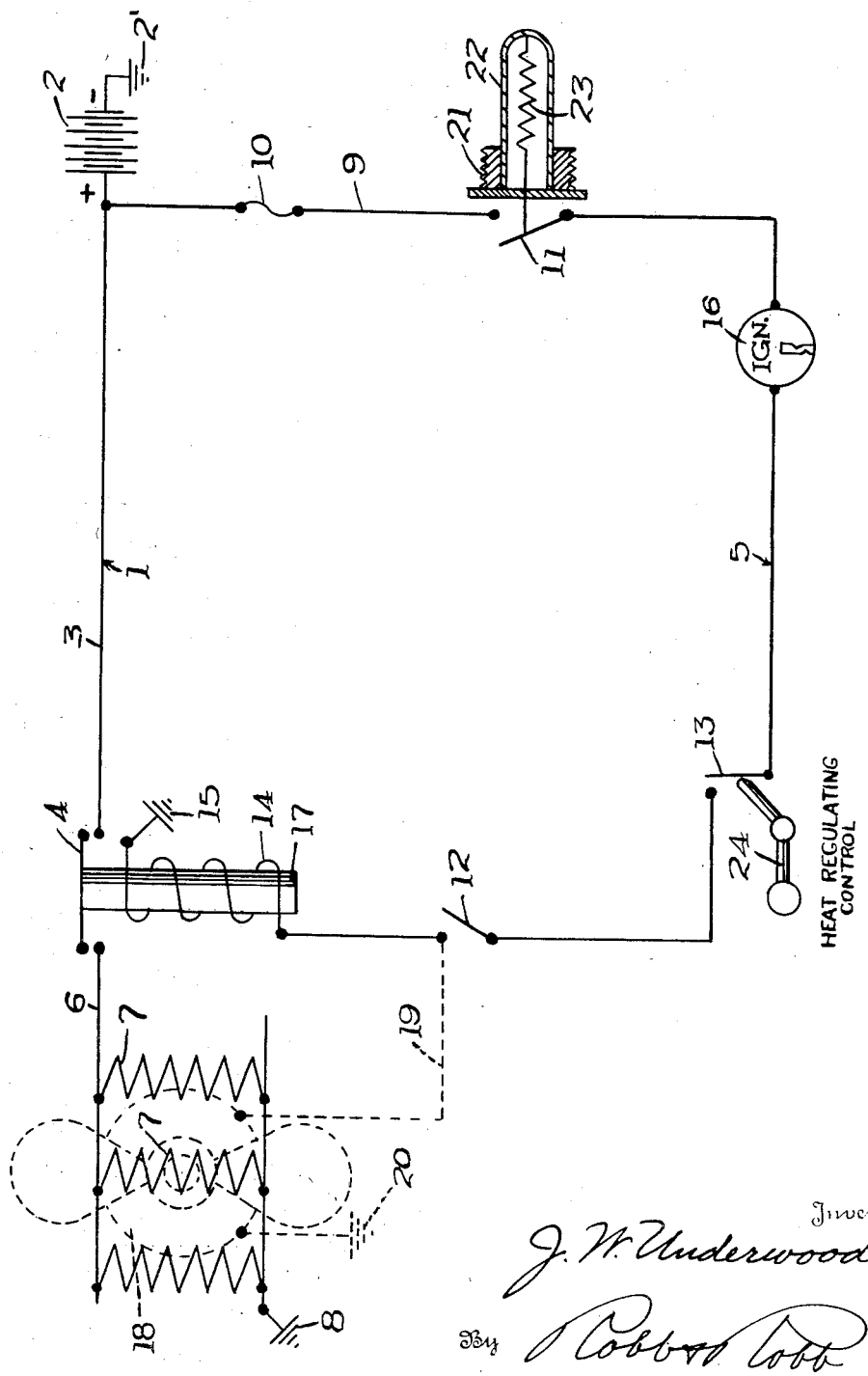

United States Patent Office 2,827,540
Patented Mar. 18, 1958

2,827,540

AUXILIARY ELECTRICAL HEATING SYSTEM FOR MOTOR VEHICLES

John W. Underwood, Charleston, W. Va.

Application May 9, 1956, Serial No. 583,716

11 Claims. (Cl. 219—38)

The present invention relates to an electrical heating system, and more particularly to an auxiliary electrical heating system for use in conjunction with the conventional heating systems with which motor vehicles are usually provided, and especially for use in the passenger compartment of passenger vehicles such as automobiles, trucks, busses and the like, to provide instantaneous heat during the period of time that is usually required for the conventional heating systems to become effective.

Conventional hot water heating systems for motor vehicles as aforesaid depend upon the vehicle engine to heat the water for the heater, such heater generally including a heat exchanger unit or coil adapted to receive hot water from the engine water jacket and to return the water to the water jacket. Therefore, when such vehicles stand idle for a sufficient length of time as to permit the engine to become cold, the conventional heater is ineffective until the engine is again started and allowed to run for a sufficient length of time to warm up. This is objectionable in cold weather, since the engine may take a substantial period of time to warm up to a sufficient degree as to provide warm water for the conventional heating system of the vehicle, and in the meantime, any occupants of the vehicle must endure the cold.

An object of the present invention, therefore, is to provide an auxiliary electrical heating system for use in such motor vehicles to supply instantaneous heat during the vehicle engine warm-up period.

Another object is to provide such an auxiliary electrical heating system which responds to the conventional heating system becoming effective, whereby the auxiliary heating system is rendered nonfunctional.

A further object is to provide such an auxiliary electrical heating system having control means interconnected with the conventional control for the conventional heater for preventing operation of the auxiliary system unless certain safety requirements are satisfied by the conventional heating system, so as to prevent damage to the auxiliary heating system as by overheating.

Still another object is to provide an auxiliary heating system as aforesaid which has control means operative responsive to conditioning of the conventional heating system for either cool weather or hot weather use, whereby the auxiliary system is automatically rendered functional in cold weather and nonfunctional in warm or hot weather.

Other objectives and advantages will be hereinafter described or will become apparent to those skilled in the art, and the novel features of the invention will be defined in the appended claims.

The accompanying drawing shows schematically an illustrative auxiliary electrical heating system in accordance with the present invention.

The illustrative heating system hereof preferably includes a heater circuit 1 deriving its source of electricity from a conventional battery 2, the negative pole of which is usually grounded as diagrammatically indicated at 2'. A lead 3 connects the positive pole of the battery to a relay switch 4 which is under the control of a control circuit generally designated 5. The relay switch 4 is adapted to connect the lead 3 to a lead 6 which is connected with several heating coils 7, with the circuit 1 grounded at the other side of the heating coils 7 as at 8.

The control circuit 5 above-referred to also derives its source of electricity from the battery designated 2 and includes a conductor line 9 preferably having a fuse 10 therein, and also having a thermostatically controlled switch 11 therein. In addition to the thermostatically controlled switch 11, the line 9 preferably has interposed therein a manually controlled switch 12, and an additional control switch 13 which is responsive to means for controlling the conventional heating system with which motor vehicles are provided, these switches 12 and 13 being adapted to establish and interrupt the circuit from the battery 2 through line 9 to an operating coil 14 for the relay 4, which coil 14 is grounded as at 15.

As a safety precaution against operation of the auxiliary system when the vehicle engine is not running and therefore the vehicle generator is not operating, the conventional ignition switch for the vehicle is preferably interposed in the line 9, as at 16.

As will now be apparent upon reference to the illustration, when the switches 11, 12, 13 and 16 of the control circuit 5 are closed, the relay-operating coil 14 will be energized to pull the armature 17 of the relay in a direction to close the heater circuit 1 through the relay switch 4, thus energizing the heating coils 7. Preferably, however, in order to avoid overheating of the coils 7, as well as to effect distribution of the heat derived from the coils 7, the heating coils are disposed in front of the conventional blower or fan of the conventional heating system with which motor vehicles are usually provided. Such a fan is shown in broken lines at 18, and as also shown in broken lines, this fan 18 is preferably energized through a line 19 which is connected to one side of the manually operable switch 12, and the fan circuit is grounded as at 20.

In practice, the source of electric current for the heating circuit 1 and the control circuit 5 is such that the heating circuit 1 is energized by the usual vehicle battery 2 and by the usual generator (not shown), as by connecting the lead or line 3 to the positive side of the conventional ammeter circuit (not shown) of the electrical system of the vehicle, while the lead or line 9 may be connected to the positive terminal of the conventional voltage regulator (not shown) of the vehicle.

The thermostatically controlled switch 11 is of any suitable type, but for use in connection with conventional hot water heating systems, it preferably includes a threaded plug or fitting 21 having a hollow tube 22 adapted to be disposed in the water jacket of the vehicle engine and having a thermo-responsive spring or element 23 in the tube 22 and connected to the switch 11 so as to normally, when cool, close the switch 11. Accordingly, when the vehicle engine is cool, the switch 11 will remain closed so as to condition the control circuit 5 for energization when the manual switch 12 is closed. However, in order to interrupt the circuit 5 during warm weather, even though the vehicle engine be comparatively cool and the thermostatically controlled switch 11 be closed, the switch 13 is adapted to be operated by a conventional control member 24 of the conventional heating system. Depending upon the type of conventional heating system, the control member 24 may be a fresh air inlet control or merely a heat regulating element or lever, but, of course, the present invention is not to be limited to the particular nature of the control member 24 of the conventional heating system. The switch 13, however, is normally closed when the conventional heating system of the vehicle is in a condition for cold weather usage, while said switch 13 is open when the conventional heating system is conditioned for warm or summer weather usage.

The operation of the auxiliary heating system hereof, as when the conventional heating system is conditioned for cool weather usage and the thermo-responsive element 23 is holding the switch 11 closed, is as follows. The operator of the vehicle must first close the ignition switch in order to render the ignition system of the vehicle operative to start the vehicle engine, and preferably after having started the engine, the operator will close the switch 12 so as to energize the coil 14 of the relay switch 4 and simultaneously close the circuit to the conventional blower or fan 18, thus energizing the heating coils 7 and providing practically instantaneous heat, while the conventional heating system of the vehicle may take a substantial length of time to become effective, since, for example, in conventional hot water heating systems, the vehicle engine must warm up in order to heat the water for such a hot water system.

As the water in the hot water heating system becomes warm, the thermo-responsive element 23 will automatically function to break the circuit 5 by the thermostatically controlled switch 11, thus rendering the auxiliary heating system inoperative as the hot water system becomes operative.

It is to be understood that the invention is not limited to use with a hot water heating system as a conventional system, but, instead, the thermostatically controlled switch 11 may be adapted to operate responsive to other conventional types of heating systems.

While the specific details of the invention have been herein shown and described, changes and alterations may be resorted to without departing from the spirit thereof as defined in the appended claims.

I claim:

1. An auxiliary electrical heating system for motor vehicles having a conventional heating system including an air-circulating fan, comprising an open-air electrical heating element adapted to be disposed in the path of air from said fan, an electrical heating circuit for said heating element, and means for establishing and interrupting said heating circuit.

2. An auxiliary heating system as defined in claim 1, wherein the means for establishing and interrupting said heating circuit comprises a separate manually operable control member disposed in the regular motor ignition circuit of the vehicle and operative to condition the heating element circuit for energization of the heating element only when the ignition circuit is energized.

3. An auxiliary heating system as defined in claim 1, wherein the means for establishing and interrupting said heating circuit comprises a separate control circuit, said control circuit having a relay switch for making and breaking said heating circuit, and means for selectively operating said relay switch.

4. An auxiliary heating system as defined in claim 1, wherein the means for establishing and interrupting said heating circuit comprises a separate control circuit, said control circuit having a relay switch for making and breaking said heating circuit, and means for selectively operating said relay switch, including a normally closed thermostatically controlled switch interposed in said control circuit and responsive to said conventional heating system, said thermostatically controlled switch having means for opening the same responsive to a predetermined rise in the temperature of the conventional heating system.

5. An auxiliary heating system as defined in claim 1, wherein the means for establishing and interrupting said heating circuit comprises a separate control circuit, said control circuit having a relay switch for making and breaking said heating circuit, and means for selectively operating said relay switch, including a switch operative responsive to control means for the conventional heating system for rendering the auxiliary heating system nonfunctional when the conventional heating system is conditioned for warm weather usage.

6. An auxiliary heating system as defined in claim 1, wherein the means for establishing and interrupting said heating circuit comprises a separate control circuit, said control circuit having a relay switch for making and breaking said heating circuit, and means for selectively operating said relay switch, including a switch for rendering the auxiliary heating system nonfunctional when the air circulating fan aforesaid is not operating.

7. An auxiliary heating system as defined in claim 1, wherein the means for establishing and interrupting said heating circuit includes means operative responsive to the temperature of said conventional heating system.

8. An auxiliary heating system as defined in claim 1, wherein the means for establishing and interrupting said heating circuit includes a thermostatically controlled switch.

9. An auxiliary electrical heating system for motor vehicles having a conventional hot water heating system and having a conventional electrical system, comprising an open-air electric heating coil, a circuit for energizing said heating coil and connected to the conventional electrical system of the vehicle, a control circuit including a relay switch interposed in said heating circuit for selectively making and breaking said heating circuit, said control circuit including a thermostatic control switch having thermo-responsive means interposed in the hot water system of said conventional heating system, and said control circuit also having a normally closed switch operative responsive to conditioning said conventional heating system for warm weather usage to interrupt said heating circuit.

10. An auxiliary heating system as defined in claim 9, wherein said control circuit includes a manually operable switch, said conventional heating system including an electrically operated blower, and said manually controlled switch being operative to energize said blower when closed to close said control circuit.

11. In combination, for use in warming the passenger compartment of a motor vehicle, a main hot water heating system, including a water circulating system and control means for selectively conditioning said main heating system for warm weather usage and for cool weather usage, and an auxiliary electrical heating system operative during the warm-up period of the water in the main heating system, said auxiliary heating system including an electric heater, means for selectively energizing said electric heater including a thermostatically controlled switch having a thermo-responsive element disposed in the water circulating system for closing said switch when the water is cool and for opening said switch when the water is warm, and a switch operatively connected to the control means aforesaid of said main heating system for effecting energization of said electric heater when the main heating system is conditioned for cool weather usage and for interrupting energization of said electric heater when the main heating system is conditioned for warm weather usage.

References Cited in the file of this patent

UNITED STATES PATENTS

| | | |
|---|---|---|
| 1,863,882 | Scharf | June 21, 1932 |
| 1,881,068 | Bates | Oct. 4, 1932 |
| 1,992,568 | Connor | Feb. 26, 1935 |

FOREIGN PATENTS

| | | |
|---|---|---|
| 400,673 | Great Britain | Nov. 2, 1933 |